(12) United States Patent
Garcia et al.

(10) Patent No.: US 8,157,534 B2
(45) Date of Patent: Apr. 17, 2012

(54) CONTROL DEVICE FOR A POWER UNIT

(75) Inventors: Fernando Banus Garcia, Barcelona (ES); Francisco Roldan Cazorla, Barcelona (ES)

(73) Assignee: Aigeltec Ingenieria, S.L., Barcelona (ES)

( * ) Notice: Subject to any disclaimer, the term of this patent is extended or adjusted under 35 U.S.C. 154(b) by 470 days.

(21) Appl. No.: 12/439,087

(22) PCT Filed: Jul. 9, 2007

(86) PCT No.: PCT/ES2007/000407
§ 371 (c)(1),
(2), (4) Date: Feb. 26, 2009

(87) PCT Pub. No.: WO2008/025864
PCT Pub. Date: Mar. 6, 2008

(65) Prior Publication Data
US 2010/0014987 A1    Jan. 21, 2010

(30) Foreign Application Priority Data
Sep. 1, 2006    (ES) ............................. 200601955 U

(51) Int. Cl.
*F04B 41/06*    (2006.01)
(52) U.S. Cl. ......................................................... 417/2
(58) Field of Classification Search ....... 417/2; 210/656
See application file for complete search history.

(56) References Cited

U.S. PATENT DOCUMENTS

| 3,068,796 A | 12/1962 | Shell |
| 2005/0109698 A1 * | 5/2005 | Gerhardt et al. .............. 210/656 |

FOREIGN PATENT DOCUMENTS

| CN | 200163745 Y | * 12/2008 |
| GB | 1376622 | 12/1974 |
| JP | 2112695 | 4/1990 |
| JP | 3194195 | 8/1991 |
| KR | 20030028165 | 4/2003 |

* cited by examiner

*Primary Examiner* — Joseph L Williams
(74) *Attorney, Agent, or Firm* — Sturm & Fix LLP

(57) ABSTRACT

The present invention refers to a control equipment for a pressure set, said pressure set being made up of a main pump and at least one auxiliary pump, characterized in that it comprises a housing fitted to the exit of the main pump, therewithin it is provided with: a pressure transducer; a minimum flow detector associated to the circulation pipe that is related to the main pump; a frequency changer to regulate the flow speed that is flowing through the hydraulic pipe that is connected to the main pump; and an electronic control circuit electrically connected to the pressure transducer, the flow detector, so that based on the signals received from them it sends a signal to the frequency changer so as to regulate the working parameters of the main pump and at least one auxiliary pump, keeping the pressure value unchanged throughout the workings of the pressure set.

17 Claims, 2 Drawing Sheets

CONTROL DEVICE FOR A POWER UNIT

OBJECT OF THE INVENTION

The present invention relates to a control equipment for a pressure set made up of several pumps, that includes appreciable innovations and advantages compared to other control equipments with the same purpose.

More specifically, the invention makes reference to a control equipment for a pressure set that is made up of several pumps, more specifically, said pressure set being made up of a main pump and at least one auxiliary pump assembled on a single housing.

BACKGROUND OF THE INVENTION

Currently the control and management of pressure set made up of a specific number of pumps or electro-pumps is well known in which the main pump is controlled by a standard market frequency changer and an external pressure transducer. The auxiliary pumps are normally controlled by relays or contactors. These standard devices do not allow the resources to be optimised and in addition these types of installations involve relatively high assembly and installation costs likewise a complicated control system arrangement, meaning that the installer has to be a specialist with very broad knowledge in regard to all of the elements to be installed.

DESCRIPTION OF THE INVENTION

The present invention has been developed for the purpose of providing a control equipment for a pressure set made up of several pumps that resolves the aforedescribed disadvantages, in addition giving other advantages that will be evident from the description that is attached below.

The control equipment of the invention for a pressure set that is made up of several pumps is, in particular, made up of a main pump and at least one auxiliary pump, and it is characterised by comprising a housing, therewithin it is provided with a pressure transducer, a flow detector associated to the circulation piping related to the main pump, a frequency changer to regulate the flow speed that flows through a hydraulic pipe associated to the main pump, and an electronic control circuit electrically connected to the pressure transducer, to the flow detector so that based on the signals received from them, it sends a signal to the frequency changer to change the working parameters of the main pump and at least one auxiliary pump, remaining the pressure value unchanged.

It should be mentioned that the auxiliary pump or pumps driving is carried out under conditions of maximum performance thereof.

Thanks to these characteristics, a control equipment is obtained that is simple to use and capable of guaranteeing a unchanged pressure and a considerable reduction of costs for control of the pressure set due to the fact that at all times the system will use the right and necessary performance in regard to the demand required and wherein multiple control elements are included in a single equipment, an aspect that is at present unknown to the same applicant.

Advantageously, the external housing of the equipment has a display outside for data monitoring, allowing the working parameters to be controlled and also to be warned about any possible errors which are detected.

In accordance with another aspect of the invention, the housing comprises a temperature detector inside, in such a way that in the event of detecting an excess temperature that could damage the control equipment, this will stop the equipment working until the optimum working temperature is recovered.

Advantageously, the control equipment is provided with cooling means for the frequency changer, said cooling means consisting of a metal plate housed on the frequency changer base whilst the opposite side of said metal plate is in contact with the fluid flow which flows in the hydraulic pipe.

Other characteristics and advantages of the control equipment for a pressure set object of the present invention will become clear from a description of a preferred embodiment, but not exclusive, that it is illustrated by way of example, without being in any way limiting, in the attached drawings.

DESCRIPTION OF A PREFERRED EMBODIMENT

Figure 1:
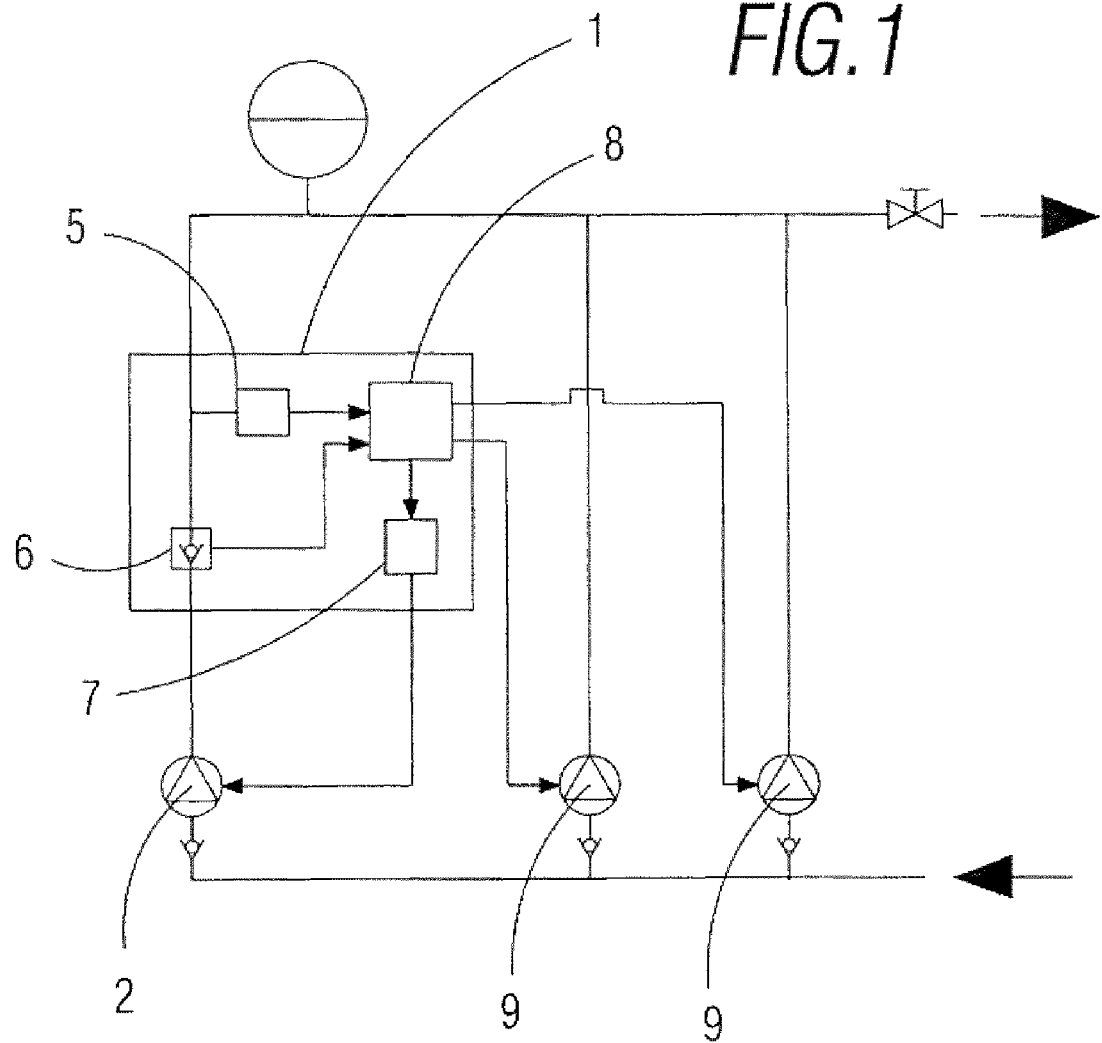
FIG. 1.—It is a diagrammatic view of a control equipment for a pressure set according to the invention.
Figure 2:
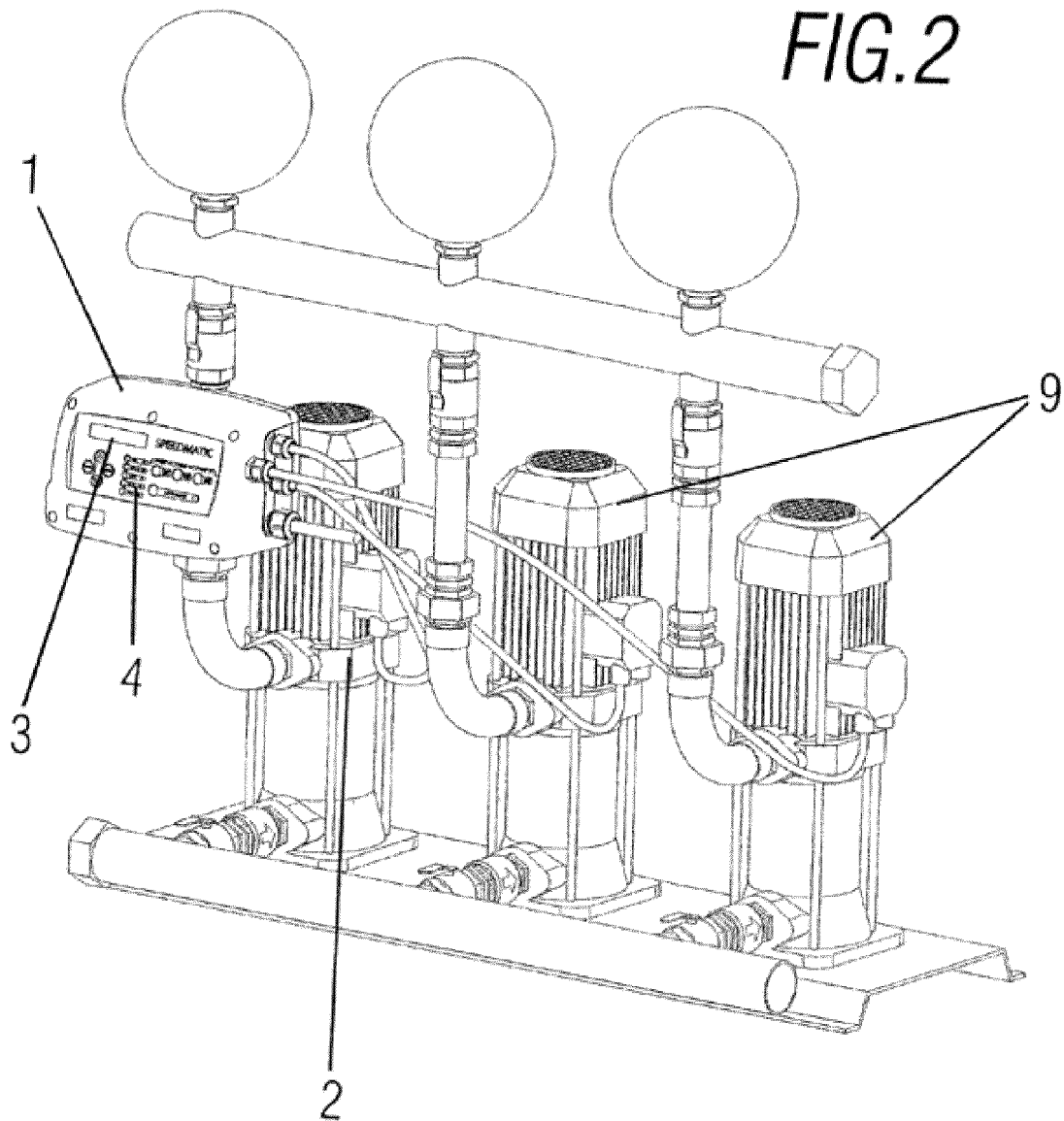
FIG. 2.—It is a perspective view of the control equipment of the invention assembled on a pressure set made up of three electric pumps.

As shown in FIGS. 1 and 2, a preferred embodiment of the control equipment to automatically control a pressure set made up of several pumps of the invention, especially in which said pressure set is made up of a conventional main electric pump and two auxiliary electric pumps (this description will not go into the details of the workings of the electric pump, likewise the respective elements) and their respective hydraulic circuit, comprising a protective housing (1) (represented in FIG. 1 by a rectangle of broken lines) assembled on the main electric pump (2) that has a display to monitor the data (3) likewise possible mistakes or breakdowns and a plurality of push buttons (4) for the management and setting of the working parameters, such as the stopping/starting for manual control of the pumps, the inner electrical elements of said housing (1) being connected to an electrical supply.

The inner of said housing (1) is provided with a pressure transducer (5), a flow detector (6) associated to the circulation pipe related to the main electrical pump (2) that in turn carries out non-return valve functions, a frequency changer (7), and an electronic control circuit (8), all of them are represented diagrammatically, electrically connected to the pressure transducer (5), to the flow detector (6), so that on the basis of the signals received from them it sends a signal to the frequency changer (7) to regulate the working parameters of the main electrical pump (2) and the two auxiliary electric pumps (9), the pressure value being kept unchanged during the workings of the pressure set.

In addition, the housing (1) comprises a cooling system inside for the frequency changer that takes advantage of the internal hydraulic circulation and another protection system that stops the pressure set in the event of an excess of temperature.

In regard to the flow detector (6) it is made up of a float which is provided with a permanent magnet inside that provides a magnetic exit signal to a magnetic switch. When the fluid flow passes through inside the pipe where the flow detector is fitted, the latter is raised and at a pre-determined flow, called minimum flow, stops sending a signal to the magnetic switch. At that moment, the pump will keep on working until the point at which, the flow is below the minimum flow. This aforedescribed system is very useful in those cases in which the required fluid flow value is small, allowing continuous working of the pump. This system represents an appreciable advance in comparison with the known systems in which the use of a hydro-pneumatic expansion tank is essential so that when by accident or wear and tear, the possibility of accumulation, that gives it the frequency of the system start up, is lost, it produces the continuous start and stop effect, thus reducing the useful working life due to a high number of internal knocks created by the effect of continuous stopping and starting.

Below is the detailed working of the aforedescribed control equipment:

When the control circuit (8) receives the signals coming from the pressure transducer (5) and the flow detector (6), it starts up the main pump (2) by means of the frequency changer and the two auxiliary pumps.

When the equipment detects a demand for water consumption, the pressure transducer will start the frequency changer working and, therefore, the main pump. The frequency changer (7) will increase or reduce the performance of the main pump in line with the needs, at all times maintaining an unchanged pressure inside the hydraulic circuit. When the control equipment detects that the pressure has dropped below a pre-determined pressure value, considered as the working pressure value, in such a way that the main pump does not give the values required, the first auxiliary pump is brought into use and if necessary subsequently the second auxiliary pump is likewise brought into use. At all times the frequency changer will keep an unchanged working pressure in the hydraulic circuit.

In the event of the hydraulic circuit ending up without fluid, the flow detector will detect the fault sending an exit stop signal to the electronic control circuit (8) for the stopping of the electric pumps, protecting them from running dry, and in turn, it will generate a visual and/or audible warning signal of the fault for the user.

It should be mentioned that the control equipment is provided with cooling means (not shown) for the frequency changer (7). Said cooling means consist of a metal plate, of aluminium, tin, etc., housed on the base or contact surface of the frequency changer (7) whilst the opposite side of said metal plate is in contact with the flow of the fluid that is circulating along the hydraulic pipe.

The details, shapes, sizes and other accessorial elements, likewise the materials used in the manufacture of the control equipment for a pressure set made up of several pumps of the invention can be appropriately substituted by others that are technically equivalent and do not stray away from the essentiality of the invention or the scope defined by the claims that are included below.

The invention claimed is:

1. Apparatus for controlling a pumping system, said pumping system comprising:
    a main pump;
    at least one auxiliary pump;
    a housing fitted to an exit of the main pump;
    a pressure transducer to detect a pressure; and
    a minimum flow detector to detect a fluid flow inside a pipe operatively connected to the main pump;
said apparatus comprising:
    a frequency changer to regulate a performance of the main pump; and
    an electronic control circuit, operatively electrically connected to the pressure transducer and the flow detector, so that, based on the signals received from the pressure transducer and the flow detector, makes decisions to bring the at least one auxiliary pump into use or to take the at least one auxiliary pump out of use, or to keep the auxiliary pump in its present state, and sends a signal to the frequency changer for regulating the performance of the main pump, maintaining the pressure unchanged.

2. The apparatus of claim 1, wherein the housing has a display outside for monitoring data.

3. The apparatus of claim 1, wherein contents of the housing additionally comprises a temperature detector.

4. The apparatus of claim 1, additionally comprising a cooling system for the frequency changer.

5. The apparatus of claim 4, wherein said cooling system comprises a metal plate to a first side of which the frequency changer is operatively affixed and wherein a second side of said metal plate is in contact with a fluid disposed in the pipe.

6. A method of controlling a pumping system, said pumping system comprising a main pump, at least one auxiliary pump, a pressure transducer, and a flow detector, the method comprising:
    (a) sensing a pressure with the pressure transducer;
    (b) detecting a flow with the flow detector;
    (c) varying a performance of the main pump based on the sensed pressure and the detected flow;
    (d) bringing the at least one auxiliary pump into use based on the sensed pressure.

7. The method of claim 6 additionally comprising taking the at least one auxiliary pump out of use based on the sensed pressure.

8. The method of claim 6 wherein, after the at least one auxiliary pump is brought into use, said auxiliary pump is operated at a constant performance.

9. The method of claim 6 wherein the pumping system also includes a control system, the method further comprising maintaining the sensed pressure at a constant value.

10. The method of claim 6 wherein the first predetermined pressure value is less than the second predetermined pressure value.

11. The method of claim 6 wherein bringing the at least one auxiliary pump into use based on the sensed pressure comprises bringing the at least one auxiliary pump into use if the sensed pressure drops below a first predetermined pressure value.

12. The method of claim 6 wherein taking the at least one auxiliary pump out of use based on the sensed pressure comprises taking the at least one auxiliary pump out of use if the sensed pressure rises above a second predetermined pressure value.

13. The method of claim 6 wherein the pumping system comprises a plurality of auxiliary pumps, the method additionally comprising:
    (a) bringing a first auxiliary pump into use based on the sensed pressure; and
    (b) bringing a second auxiliary pump into use based on the sensed pressure while the first auxiliary pump is in use.

14. The method of claim 6 wherein the pumping system comprises a plurality of auxiliary pumps, the method additionally comprising:
    (a) taking a first auxiliary pump out of use based on the sensed pressure; and
    (b) taking a second auxiliary pump out of use based on the sensed pressure while the first auxiliary pump is out of use.

15. A method of cooling a control system for a pumping system, wherein said pumping system comprises a main pump, at least one auxiliary pump, piping to conduct a pumped fluid, and a plate having a first side and a second side, the method comprising:
- (a) operatively affixing physical components of the control system to a first side of a plate; and
- (b) disposing a second side of the plate to the fluid conducted in the piping.

16. The method of claim 15 wherein the pumping system additionally comprises a display, the method additionally comprising displaying data related to the pumping system on the display.

17. The method of claim 15 the method additionally comprising:
- (a) providing a control system user interface;
- (b) managing the pumping system through the control system user interface; and
- (c) setting control parameters of the control system through the control system user interface.

* * * * *